May 5, 1964   C. VAN DER LELY   3,131,774
ROTARY FLEXIBLE TINE CULTIVATOR
Filed Oct. 10, 1960   7 Sheets-Sheet 1
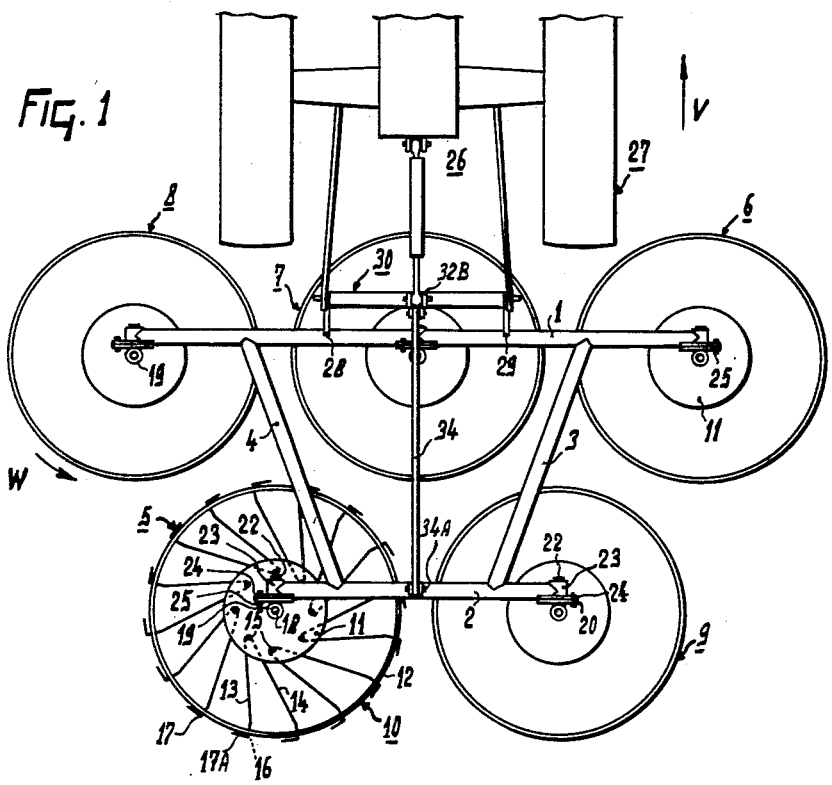
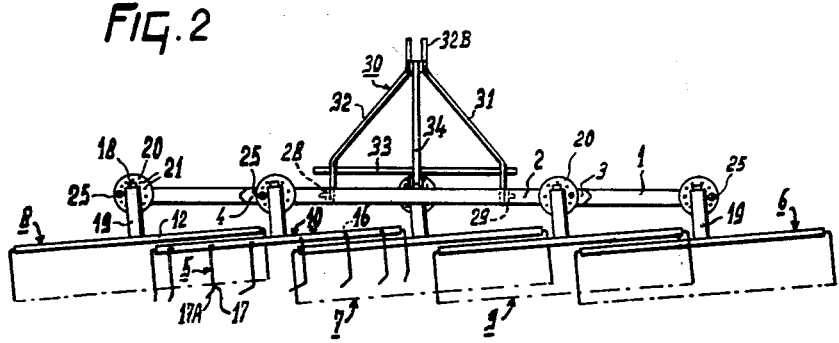
CORNELIS VAN DER LELY
INVENTOR.
BY Mason, Mason & Albright
ATTORNEYS May 5, 1964   C. VAN DER LELY   3,131,774
ROTARY FLEXIBLE TINE CULTIVATOR
Filed Oct. 10, 1960   7 Sheets-Sheet 2
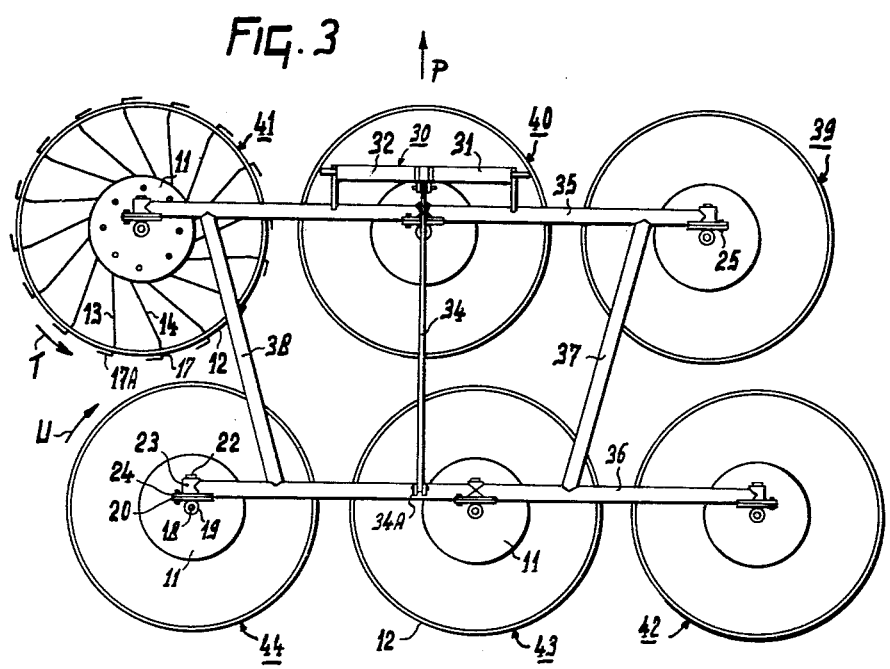
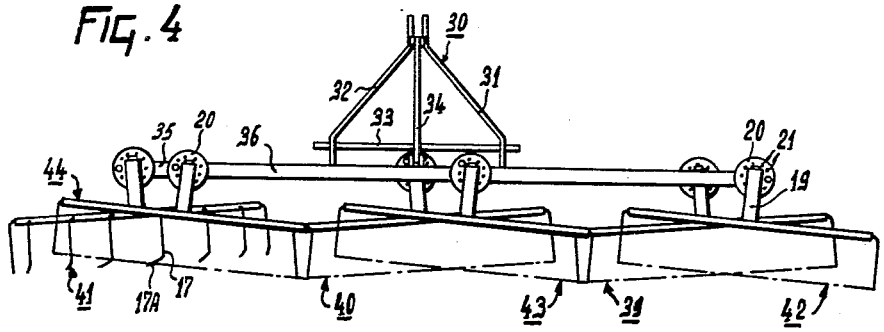
Cornelis van der Lely
INVENTOR.
BY Mason, Mason & Albright
ATTORNEYS May 5, 1964     C. VAN DER LELY     3,131,774
ROTARY FLEXIBLE TINE CULTIVATOR
Filed Oct. 10, 1960     7 Sheets-Sheet 3
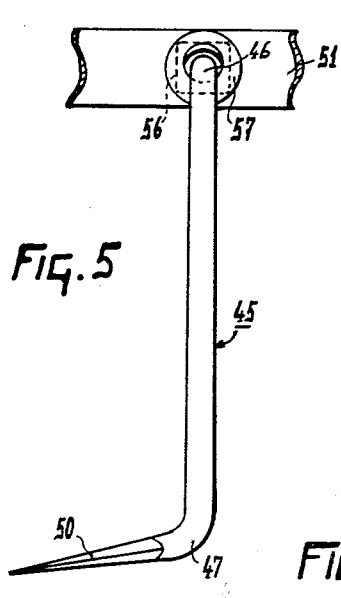
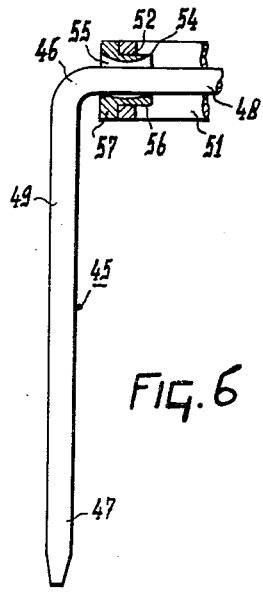
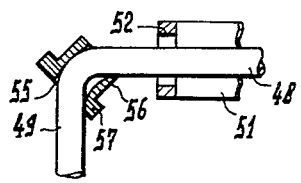
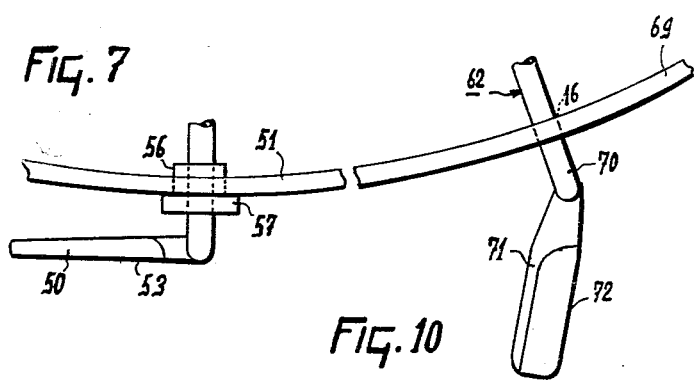
Cornelis van der Lely
INVENTOR.
BY Mason, Mason & Albright
ATTORNEYS

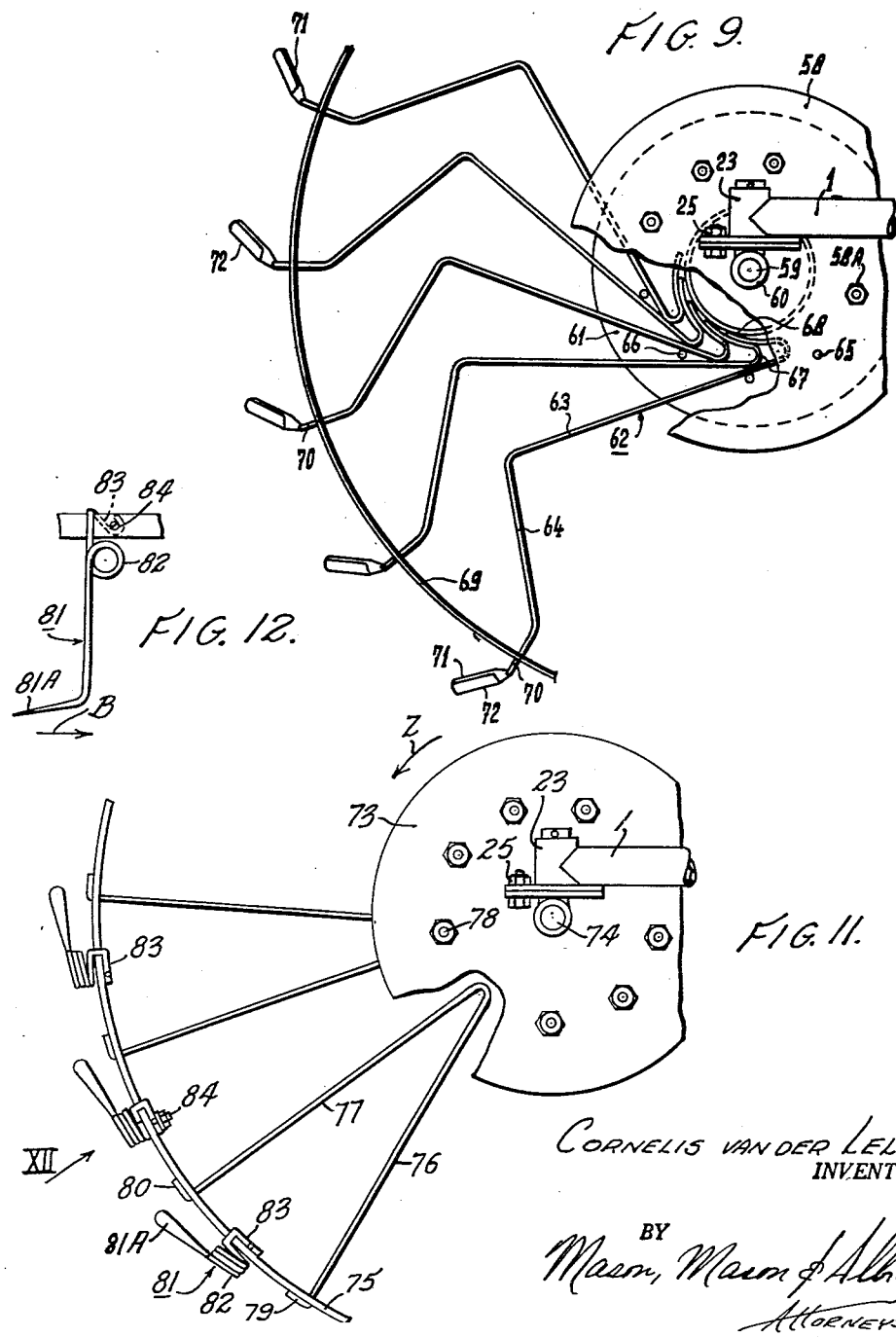

May 5, 1964   C. VAN DER LELY   3,131,774
ROTARY FLEXIBLE TINE CULTIVATOR
Filed Oct. 10, 1960   7 Sheets-Sheet 5

CORNELIS VAN DER LELY
INVENTOR.

BY
Mason, Mason & Albright
ATTORNEYS

May 5, 1964  C. VAN DER LELY  3,131,774
ROTARY FLEXIBLE TINE CULTIVATOR
Filed Oct. 10, 1960  7 Sheets-Sheet 6

CORNELIS VAN DER LELY
INVENTOR.

BY Mason, Mason & Albright
ATTORNEYS

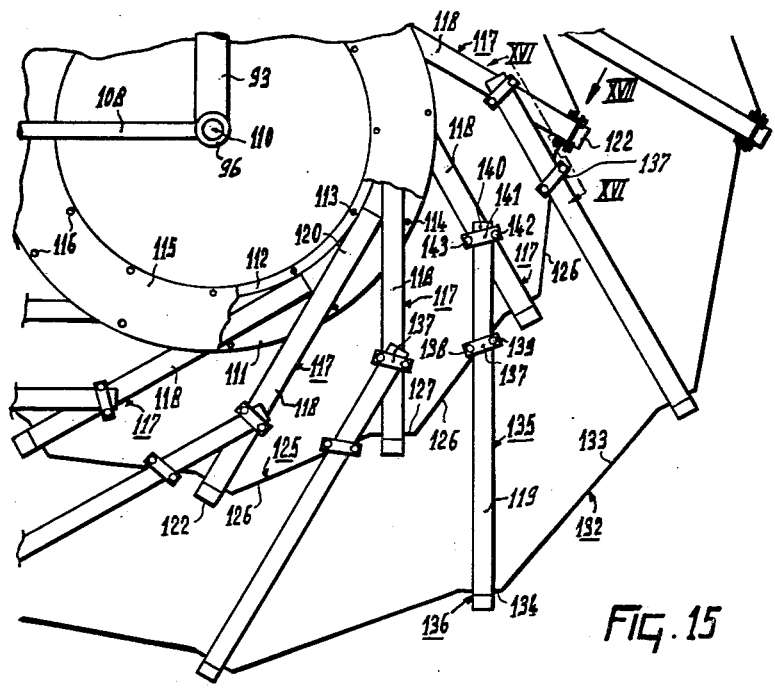

United States Patent Office 3,131,774
Patented May 5, 1964

3,131,774
ROTARY FLEXIBLE TINE CULTIVATOR
Cornelis van der Lely, Zug, Switzerland, assignor to C. van der Lely N.V., Maasland, Netherlands, a Dutch limited liability company
Filed Oct. 10, 1960, Ser. No. 61,760
Claims priority, application Netherlands Oct. 16, 1959
8 Claims. (Cl. 172—526)

This invention relates to cultivators and harrows (hereinafter all referred to as "cultivators").

According to the invention, there is provided a cultivator comprising a frame upon which is mounted one or more tined cultivating tools which is adapted to revolve about an axis inclined to the horizontal at an angle of more than 45° and less than 90° whereby, during operative movement of the implement over the ground, a lower region of the tool is in engagement with the ground and the tool is revolved about its axis, the tines of the tool being resiliently mounted thereon.

Figure 13:
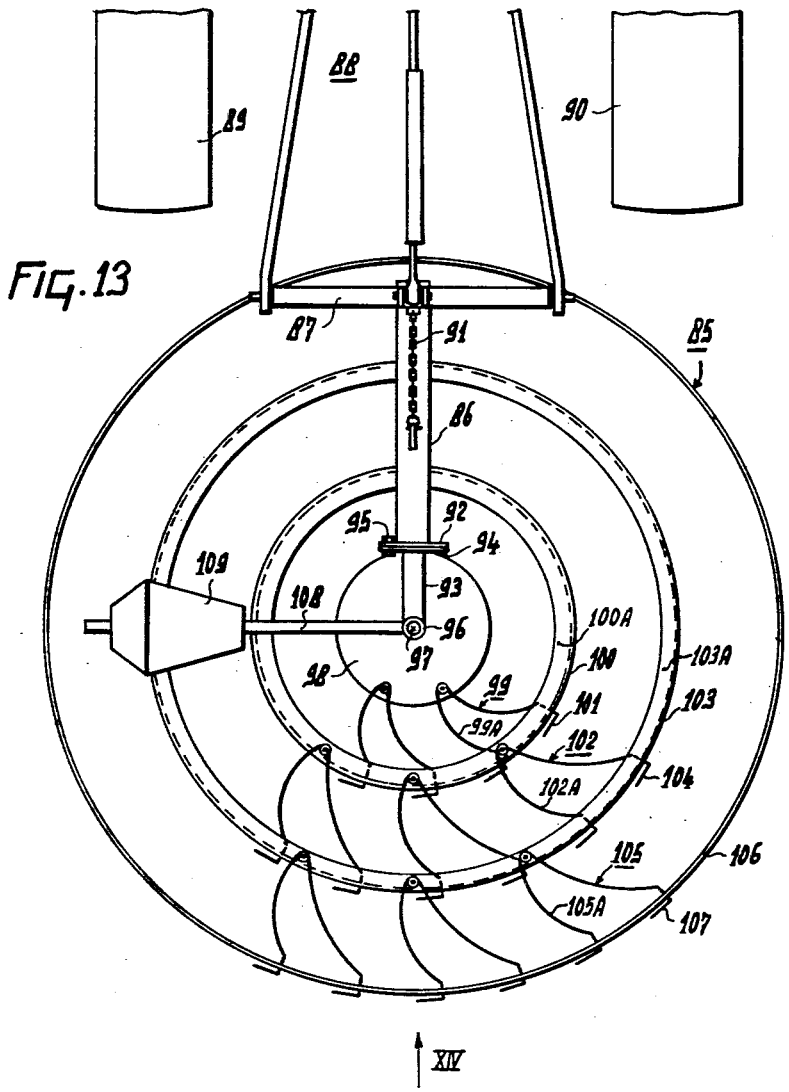
Figure 14:
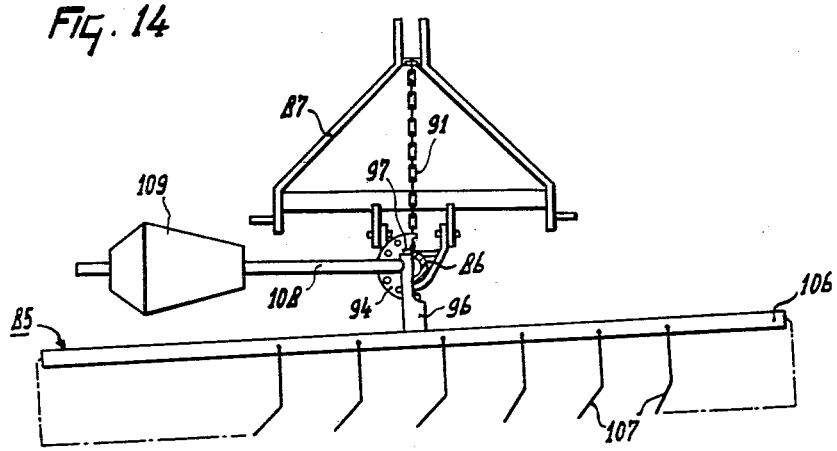
Figure 16:
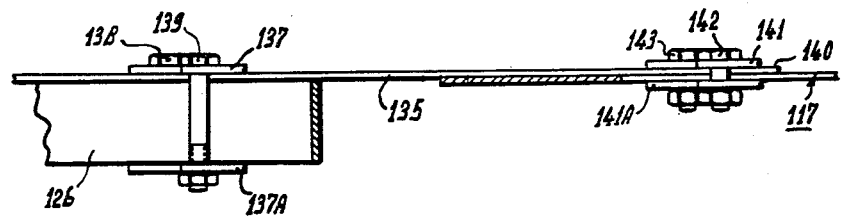

For a better understanding of the invention and to show how the same may be carried into effect, reference will now be made, by way of example, to the accompanying drawings, in which:

FIGURE 1 is a plan view of a cultivator in accordance with the invention in position at the rear of a tractor, FIGURE 2 is a rear elevation of the cultivator shown in FIGURE 1, FIGURE 3 is a plan view of another embodiment of a cultivator in accordance with the invention, FIGURE 4 is a rear elevation of the cultivator shown in FIGURE 3, FIGURE 5 is a front elevation, to an enlarged scale, of a part of the cultivators of FIGURES 1 to 4, FIGURE 6 is a side elevation corresponding to FIGURE 5, FIGURE 7 is a plan view corresponding to FIGURES 5 and 6, FIGURE 8 corresponds to FIGURE 6 but shows parts in a different relationship, FIGURE 9 is a plan view, to an enlarged scale, showing an alternative form of part of the cultivators shown in FIGURES 1 to 4, FIGURE 10 is a plan view, to an enlarged scale, illustrating a detail of the construction shown in FIGURE 9, FIGURE 11 is a plan view, to an enlarged scale, showing a further alternative embodiment of part of the cultivators shown in FIGURES 1 to 4, FIGURE 12 is a view taken in the direction indicated by the arrow XII of FIGURE 11, FIGURE 13 is a plan view of another form of cultivator in accordance with the invention in position at the rear of a tractor, FIGURE 14 is a view, partly in section, taken in the direction indicated by the arrow XIV of FIGURE 13, FIGURE 15 is a plan view of part of another form of cultivator in accordance with the invention, FIGURE 16 is a section, to an enlarged scale, taken on the line XVI—XVI of FIGURE 15, and FIGURE 17 is a view, to an enlarged scale, taken in the direction indicated by the arrow XVII of FIGURE 15.

Referring to the drawings, the cultivator shown in FIGURES 1 and 2 comprises transverse horizontal frame beams 1 and 2 which are rigidly connected to one another by frame beams 3 and 4. Two lugs 28 and 29 project from the leading side of the frame beam 1 and a link 34 is turnably mounted about a horizontal pivot pin 34A secured at a location midway along the length of the frame beam 2, the link 34 projecting forwardly of the implement and being inclined upwardly from the said pivot pin 34A. A coupling member, generally indicated by the reference numeral 30, is secured to the lugs 28 and 29 and the link 34 and comprises two oppositely inclined arms 31 and 32 whose lower ends are turnable about horizontal pins lodged in holes in the lugs 28 and 29 and whose upper ends support a fork 32B. The lower ends of the arms 31 and 32 are both rigidly connected to a horizontal strengthening rod 33. The coupling member 30 may be used in the manner shown in FIGURE 1 to connect the cultivator to the lifting device 26 of a tractor 27, the said lifting device 26 being provided with a pair of lower links and an upper lifting arm in a conventional manner.

The frame beam 1 supports three cultivating tools 6, 7 and 8 and the frame beam 2 supports two similar cultivating tools 9 and 10, only the tool 10 being shown in detail in the drawings. The frame beam 2 has a horizontal bearing 23 secured thereto within which bearing is journalled a horizontal stub shaft 22 having a circular plate 20 and a bearing 19 rigid therewith. A circular plate 24, similar to the circular plate 20, is rigid with the horizontal bearing 23, both the plates 20 and 24 being formed with a series of holes 21 which can be brought into alignment with one another in different combinations by angular adjustment of the said stub shaft 22 in the bearing 23. A locking pin or bolt 25 is provided which can be inserted into any two aligned holes 21 to secure the stub shaft 22 in a corresponding angular setting relative to the bearing 23. A shaft 18 is rotatably journalled in the bearing 19 and has a flange 11 forming a central portion of the tool rigidly secured to its lower end.

Tines 5 are formed in integral pairs comprising root portions 13 and 14 whose junctions are secured to the flange 11 by means of a bolt 15, and ground-working portions 17 which are bent-over with respect to the root portions 13 and 14. A felly 12 is concentric with the vertical shaft 18 and has a plurality of holes 16 formed therein through which holes pass the said tines 5, the junction between the portion 17 and the portion 13 or 14 of each tine being located immediately on that side of the felly 12 remote from the shaft 18. The tines 5 are a loose fit in the holes 16 so that the root portions 13 and 14 can be torsionally deformed in response to movements of the crop-working portions 17. The free end 17A of each crop-working portion 17 is inclined to the major part of that portion in a direction which extends rearwardly of the intended direction of rotation of the cultivating tool about the said shaft 18, the portions 17 extending substantially parallel to the said shaft 18. Each end 17A extends substantially tangentially with respect to a circle having its center on the axis of rotation.

As previously stated, the cultivating tools 6 to 9 are substantially identical in construction to the tool 10 and are secured to the frame beam 1 or to the frame beam 2 in a substantially identical manner. The axis of rotation of the tool 10 is disposed approximately midway between those of the tools 7 and 8 viewed in the intended direction of travel V of the cultivator and the axis of rotation of the tool 9 is similarly disposed midway between those of the tools 6 and 7. A line joining the axis of rotation of one of the tools secured to the leading frame beam 1 to the axis of rotation of one of the tools secured to the rear frame beam 2 is therefore inclined to the said direction of travel V.

When the cultivator is moved over the ground by the tractor 27 in the direction indicated by the arrow V, a lower region of each of the tools 6 to 10 is in engagement with the ground by way of the free ends 17A of the tines 5. The magnitude of the segment of each of the tools which is in engagement with the ground will depend upon the inclination of the plane of rotation thereof to the horizontal, which inclination is set by means of the aforementioned locking pin or bolt 25. For most purposes, the longitudinal axis of the shaft 18 is inclined at an angle of less than 90° but of not less than 60° to the horizontal, 75° being a setting which is satisfactory for most purposes. However, in certain cases, the shaft 18 may be inclined to the horizontal at an angle which is very little greater than 45°. Each tool is rotated about its shaft 18 by virtue of the contact of the said lower region with the ground, the tools being inclined in such a way that each of them rotates in the direction indicated by the arrow W (see FIGURE 1), the free end 17A of each of the tines being inclined rearwardly with respect to this direction of rotation.

When the planes of rotation of the tools 6 to 10 are inclined to the horizontal as shown in FIGURE 2, the root portions 13 and 14 of the tines 5 may be said to be disposed substantially horizontally whereas the portions 17 are disposed substantially vertically. Due to the fact that each tine 5 is of resilient construction, each of the tools will be deformed generally by its contact with the ground in such a way that a major segment disposed mainly to the left of each axis of rotation in FIGURE 2 will be in contact with the ground whilst a minor segment disposed wholly to the right of each axis of rotation will be maintained clear of the ground. The major segment of each tool in contact with the ground will thus break up the soil during its rotation by movement of the tine portions 17 therethrough. A component of the force exerted by the soil on each portion 17 will extend in an opposite direction to the direction of travel V, and parallel thereto. Due to the fact that the corresponding root portion 13 or 14 is inclined to a line joining the corresponding hole 16 in the felly 12 with the axis of rotation 18, the said root portion will be able to deflect resiliently when the portion 17 meets an obstacle such as a stone, even when the portion 17 is disposed immediately in front of the axis of rotation afforded by the shaft 18 with respect to the direction of travel V. Each felly 12 can deflect in directions extending parallel to the axis of rotation of the tool and is angularly displaceable in a plane perpendicular thereto since it is only secured to the flange 11 of its corresponding tool by way of the rod-shaped root portions 13 and 14 which are, themselves, deflectable in any direction. In this way a favorable working of the device is obtained. Since the five shafts 18 are located alongside one another viewed in the direction V, the cultivator is capable of working a wide unbroken strip of land.

FIGURES 3 and 4 show a cultivator having a leading transverse frame beam 35 and a rear transverse frame beam 36 which frame beams are rigidly connected to one another by means of further frame beams 37 and 38. The leading end of the cultivator is provided with a coupling member 30 identical to that described in connection with FIGURES 1 and 2 of the drawings, and six cultivating tools 39 to 44 are adjustably secured to the frame beams 35 and 36 in a substantially identical manner to that already described in respect of the tool 10.

Each of the three tools 39 to 41 secured to the leading frame beam 35 is of identical construction to the tool 10 previously described in detail and, as can be seen in FIGURE 4, is arranged so that, during operation, it rotates in a direction T which is the same as the direction W. The three tools 42 to 44 are arranged with their planes of rotation inclined to the horizontal in such a way that, during operation, they rotate in a direction U which is opposite to the direction T. This makes it recommendable that each of the root portions 13 and 14 is oppositely inclined to those shown in FIGURE 3 in connection with the tool 41 and that each free end 17A of each tine is also oppositely inclined in order that it shall extend rearwardly of the direction of rotation U.

In the arrangement shown in FIGURES 3 and 4, a line joining the axis of rotation of any of the tools 39 to 41 to that of any of the tools 42 to 44 is inclined to the intended direction of travel P of the cultivator. In contrast to the first embodiment described, the distance between the axis of rotation of the tool 41 and that of the tool 44, considered laterally of the cultivator, is less than half the radius of either of the tools. This arrangement is favourable due to the opposite directions of rotation of the various tools and is such that, as can be seen in FIGURE 4, a relatively broad unbroken strip of land can be cultivated.

In an arrangement such as that shown in FIGURES 3 and 4 in which an equal number of tools are adapted to rotate in each of two opposite directions, the resultant of all the forces exerted by the ground on the tools during their operation will extend in an opposite direction to, but substantially in line with, the longitudinal axis of the tractor which propels the cultivator. When all the tools are adapted to rotate in the same direction, as described in connection with FIGURES 1 and 2, the resultant of the forces acting thereon during operation does not coincide with the longitudinal axis of the tractor and this can, in certain circumstances, make accurate steering of the tractor difficult.

FIGURES 5 to 7 show an embodiment of a ground-working portion 45 of a tine such as the tine 5 shown in FIGURES 1 and 2. The said portion 45 comprises a horizontal part 48, a vertical part 49, and an inclined free end 50, the parts 48 and 49 being connected by an integral bend 46 and the part 49 and the free end 50 being connected by an integral bend 47. The part 48 corresponds to the root portions 13 and 14 previously described and can be torsionally deformed by movements of the parts 49 and 50. The free end 50 is flattened and the side thereof remote from the axis of rotation of the corresponding tool is formed as a cutting edge 53. The part 48 passes through a hole 52 in a felly 51, similar to the felly 12 previously described, a bearing shell 54 being interposed between the part 48 and the periphery of the hole 52 in order to reduce wear on both the part 48 and the felly 12. The bearing shell 54 may be made of, for example, cast iron or from a synthetic plastic material. The bore 55 through the bearing shell 54 is curved, the radius of curvature being greater than that of the aforementioned bends 46 and 47 in order to enable the bearing shell to be passed around these bends (see FIGURE 8) to reach the position shown in FIGURE 6. The bearing shell 54 is formed from a portion 56 of rectangular cross-section, a circular flange 57 being formed integrally with the said portion 56. The hole 52 in the felly 51 is of such a shape that it co-operates with the portion 56 in preventing the bearing shell 54 from rotational displacement therein. As can be seen in FIGURES 6 and 8, after passing the bearing shell 54 around the bend 46, it is rotated through 180° before being lodged in the hole 52. The bearing shell 54 cannot, therefore, be axially displaced through any substantial distance to the left in FIGURE 6 once the construction of the tool is completed nor can it move axially to the right due to the abutment of the flange 57 against the side of the felly 51.

FIGURE 9 shows part of another form of cultivating tool having a central circular flange 58 to which a shaft 59 is rigidly secured, the shaft 59 being rotatably journalled in a bearing 60 and affording the axis of rotation of the said tool. The bearing 60 is adjustably connected to a frame beam 1 in an identical manner to that described in connection with FIGURES 1 and 2 of the drawings. A plate 61 is concentrically arranged with respect to the flange 68 and is rigidly secured thereto by means of a number of bolts 58A each of which is passed through a hole 66 in the plate 61 and a hole 65 in the flange 58. A plurality of tines 62 each have an inner section 63 of their root portions clamped between the flange 58 and plate 61, the inner free ends 67 of all the tines 62 being bent into a form which is such that they lie against one another. The extreme inner end of each tine 62 is in engagement with a rim 68 formed on the plate 61 and each alternate tine 62 abuts against one of the bolts 58A. The arrangement of the tines 62 is, in fact, such that when the flange 58 and plate 61 are securely bolted to one another, each tine is retained in the position relative to its neighbors which is shown in FIGURE 9. In addition to the inner root section 63, each tine has an outer root section 64 which is inclined to the section 63, and a ground-working portion 70 having a flattened free end 71 provided, on the side remote from the shaft 59, with a cutting edge 72. Each end 71 lies at an angle to the tangent to a circle having its center on the axis of rotation of the tool.

Each portion 70 passes through a hole 16 in a felly 69, a substantial degree of clearance being provided between the said portion 70 and the periphery of the hole 16. The root portion of each tine 62 which is formed by the two sections 63 and 64 is capable of torsional deformation upon movement being imparted to the ground-working portion 70. Each of the sections 63 is tangential to an imaginary circle having the shaft 59 as its center and each of the sections 64 is tangential to another similar imaginary circle. Each ground-engaging portion 70 can deflect in any direction due to torsional deformation of the sections 63 and 64 and/or due to the fact that the felly 69 can move in any direction owing to its resilient connection with the flange 58.

Tines having free ends provided with cutting edges such as those shown in FIGURES 5 to 7 and in FIGURE 10 are suitable for use in cultivators which are to be employed for weeding or for mixing fibrous materials, such as stable manure, with top soil which has already been ploughed. Tines of this kind may also be used advantageously in the cultivation of fields of stubble.

FIGURES 11 and 12 show a further form of cultivating tool which may be used in a cultivator such as that shown in FIGURES 1 and 2 or FIGURES 3 and 4. The tool comprises a central flange 73 to which a shaft 74 is rigidly secured, the shaft 74 affording the axis of rotation of the tool and being connected to a frame beam 1 in an identical manner to that described in connection with FIGURES 1 and 2. A felly 75 is concentrically supported relative to the shaft 74 by means of resilient pairs of integral coupling rods 76 and 77 which are secured to the flange 73 by means of bolts 78. The free ends 79 and 80 of the coupling rods 76 and 77 respectively are taken through bores formed in the felly 75 and are bent through a right-angle at the side of the felly 75 remote from the shaft 74. A plurality of tines 81 are each secured to the felly 75 at locations midway between the coupling rods 76 and 77. This is achieved by means of a corresponding bolt 84 which passes through a hole in the felly 75 and around which is engaged a hook-shaped portion 83 which is integral with the remainder of the tines 81 and which is connected thereto through the intermediary of a helical spring 82. Each tine 81 extends substantially parallel to the axis of rotation afforded by the shaft 74 and, is provided with a flattened free end 81A which is inclined to the vertically extending part of the tine. As can be seen in FIGURE 11, the spring 82 is disposed on the side of the felly 75 remote from the shaft 74 whereas the hook-shaped portion 83 is disposed on the opposite side. Thus the spring 82, which extends perpendicularly to the axis of rotation of the tool, is not arranged around the length of the bolt 84.

When a cultivating tool as shown in FIGURES 11 and 12 is used in a cultivator of the kind shown in FIGURES 1 and 2, it will rotate about the shaft 74 in the direction indicated by the arrow Z (FIGURE 11). The free end 81A of each tine 81 will be turned in the direction indicated by the arrow B (FIGURE 12) due to its engagement with the ground, such turning movement being resiliently opposed by the helical springs 82. The coupling rods 76 and 77 are, as has previously been stated, preferably of resilient construction so that the felly 75 can move a short distance in any direction upon a tine 81 meeting an obstacle. The coupling rods 76 and 77 are shown as extending substantially radially with respect to the axis of rotation afforded by the shaft 74 but, if desired, they may be arranged tangentially with respect to an imaginary circle having the shaft 74 as its center.

FIGURES 13 and 14 show a cultivator having a single cultivating tool generally indicated by the reference numeral 85. The frame of the cultivator is comprised principally by a frame beam 86 which can be connected by means of a coupling member 87, similar to the coupling member 30 previously described, to the lifting device 88 of a tractor of which latter only the rear wheels 89 and 90 are shown in FIGURE 13. A chain 91 takes the place of the link 34 shown in FIGURES 1 to 4 of the drawings. The rear end of the frame beam 86 is hollow and rotatably receives the leading end of a frame beam 93. A circular plate 92 is secured to the frame beam 86 and a similar circular plate 94 is secured to the frame beam 93, both plates being formed with a series of holes, any two of which can be brought into alignment. A locking pin or bolt 95 is provided for insertion in any two aligned holes so that the frame beam 93 can be secured in a corresponding setting of angular adjustment relative to the frame beam 86. A vertical bearing 96 is secured to the rear end of the frame beam 93, a shaft 97 being rotatably received therein, to the lower end of which shaft is rigidly secured a flange 98.

Three fellys 100, 103 and 106 are concentrically arranged around the flange 98 and are interconnected by means of three series of tines 99, 102 and 105. Each tine 99 is of resilient construction and has a root portion 99A and a ground-working portion 101; each tine 102 has similar portions 102A and 104 and each tine 105 has similar portions 105A and 107. The tines 99 are bolted to the flange 98 and pass through holes in the felly 100 whilst the tines 102 are bolted to the felly 100 and pass through holes in the felly 103 and each tine 105 is bolted to the felly 103 and passes through holes in the felly 106. The fellys 100 and 103 are formed with annular portions 100A and 103A respectively to which the tines 102 and 105 are respectively bolted. The resilient tines 99, 102 and 105 are formed in pairs and interconnect the fellys 100, 103 and 106 in such a way that the latter can deflect through a small distance in any direction upon the crop-working portion of one or more tines meeting an obstacle. As in the previous embodiments, each of the root portions 99A, 102A and 105A is capable of torsional deformation upon a turning movement being imparted to the corresponding ground-working portion due to the latter coming into contact with an obstacle.

As can be seen in FIGURE 14, the cultivating tool 85 is arranged so that its plane of rotation is inclined to the horizontal so that the lower region thereof lies mainly to the left of the longitudinal axis of the tractor. The axis of rotation afforded by the shaft 95 is inclined to the horizontal by an angle which, as previously stated in connection with FIGURES 1 and 2, is less than 90° but greater than 45° and is conveniently about 75°.

In order that the lower region of the tool should be brought firmly into engagement with the ground during operation of the cultivator, an arm 108 is secured to the bearing 96 in such a position that it extends over and above the said lower region of the tool, a weight 109 being mounted on the said arm 108.

During operation of the cultivator shown in FIGURES 13 and 14, each of the separate series of tines 99, 102 and 105 will break up the soil over which the cultivator is passing. Although each series of tines follows a separate path, it will be apparent that a single strip of land will be thoroughly cultivated due to the fact that movement of the tool over the land causes the working paths traced by the three series of tines to intersect one another.

FIGURES 15 to 17 show part of an alternative form of cultivating tool which includes frame beams 86 and 93 similar to those shown in FIGURE 13, the frame beam 86 being adapted to be secured to the lifting device of a tractor in a manner similar to that shown in FIGURES 13 and 14. Some parts of the tool are omitted in FIGURE 15 for the sake of clarity. A shaft 110 is rotatably journalled in a bearing 96 and affords the axis of rotation of the cultivating tool, a flange 111 being rigidly secured to its lower end and the flange 111 being formed with an upwardly projecting ridge 112. The ridge 112 is formed with a series of holes 113 and a similar series of holes 114 is formed close to the outer periphery of the flange 111. An annular ring 115 is secured to the flange 111 by means of bolts which are taken through the aforementioned holes 113 and 114 and through matching holes 116 formed in the said ring 115. The inner ends of tines 117 clamped between the said ring 115 and the peripheral region of the flange 111, the said tines being of a thickness approximately equal to the height of the ridge 112. Each tine is formed from a length of resilient strip, the inner end 120 of which has one edge in abutting relationship with the ridge 112 and the opposite edge in abutting relationship with both the edge of a further strip and one of the bolts which passes through a bore 114 and a hole 116.

Each tine 117 has a root portion 118 which lies in a plane perpendicular to the shaft 110 and a ground-engaging portion 121 which extends substantially parallel thereto. The extreme free end of each ground-engaging portion 121 is bent-over to form a portion 122 which, in the drawings, is inclined to the horizontal at an angle of about 45°. This angle may, if desired, be varied to suit the different types of work which the cultivator may have to undertake. As can be seen in FIGURE 17, additional strips 123 and 124 are arranged beneath the tine 117 at the point where the root portion 118 merges into the ground-engaging portion 121. These strips 123 and 124 are formed from spring steel and serve to strengthen the tine in this area. The portion 121 of each tine 117 together with the corresponding strips 123 and 124 is secured to the radially outermost side of a felly 125 by clamping plates 128 and 129 which are drawn together by upper and lower pairs of bolts 130 and 131. The felly 125 extends through 360° around the shaft 110 and is formed from alternate longer straight portions 126 and shorter straight portions 127, each portion being inclined to both its neighbours. Each tine 117 is clamped by means of the aforementioned plates 128 and 129 to a corresponding one of the shorter portions 127.

A further felly 132, formed from alternate longer straight portions 133 and shorter straight portions 134, also extends through 360° around the shaft 110 but at a greater distance from the latter than the felly 125. The fellys 132 and 125 are interconnected by means of a plurality of tines 135 each of which is made from a strip of spring steel similar to that employed in the construction of the tines 117. Each tine consists of a root portion 119 which extends substantially perpendicular to the shaft 110 and a ground-engaging portion 136 which is substantially identical to the portion 122 previously described. Each portion 136 is clamped to a shorter straight portion of the felly 132 in a manner substantially identical to that described in connection with FIGURE 17. The inner end 140 of each tine 135 is clamped to an intermediate location along the length of a corresponding one of the tines 117 by means of upper and lower clamping plates 141 and 141A respectively, the said clamping plates being drawn together by means of bolts 142 and 143 disposed on opposite sides of the two tines 117 and 135 respectively as seen in plan view. Each tine 135 is also secured to a corresponding longer portion 126 of the felly 125 by means of upper and lower clamping plates 137 and 137A respectively, the said clamping plates being drawn together by means of two bolts 138 and 139 which lie on opposite sides of the tine 135 and against opposite faces of the felly 125.

Owing to the resilient construction of all the tines 117 and 135 and of the fellys 125 and 132, each ground-engaging portion 121 or 136 is capable of deflecting a small distance in any direction, this deflection being particularly readily accomplished in directions extending parallel to the shaft 110. It will be appreciated that, although two fellys are shown in FIGURE 15, the cultivating tool may be provided with one felly or with three or more fellies merely by unbolting one series of tines or by adding further series in a similar manner to that described for the series of tines 135.

Although the ground-working portions of the tines have been described as extending substantially parallel to the axis of rotation of the corresponding cultivating tool in each case, these portions may, if desired, be inclined to this axis in accordance with the nature of the work to be undertaken by the cultivator. Each of the fellies described has been shown as of open-ended cylindrical formation, the longitudinal axis of the cylinder coinciding with that of the axis of rotation of the cultivating tool. However, if desired, the fellies may be of flat annular shape and extend in a plane perpendicular to the said axis of rotation.

What I claim is:

1. A cultivating tool which comprises a central portion, at least two substantially circular fellies of different diameters, resilient connecting members extending outwardly from said central portion and securing the smaller of said fellies in concentric relationship with said central portion, a plurality of further resilient connecting members extending outwardly from said smaller felly and securing in concentric relation thereto a larger felly, and a plurality of resilient tines extending normally from each of said resilient connecting members and said fellies.

2. A cultivating tool which comprises a central portion, at least two substantially circular fellies, each of said fellies being composed of resilient material and consisting of a series of alternating inclined long and short sections, resilient connecting members extending outwardly from said central portion to one of said fellies and securing same in concentric relationship therewith, a plurality of further connecting members extending outwardly from said latter felly to a further of said fellies and securing same in concentric relationship therewith, and a plurality of resilient tines extending normally from each of said connecting members and said fellies, said connecting members securing said fellies at said short sections.

3. A cultivating tool which comprises a central portion, at least two fellies of different size, each of said fellies being composed of resilient material and consisting of a series of alternating inclined long and short sections, a plurality of resilient connecting members extending outwardly from said central portion and securing a smaller of said fellies in concentric relationship with said central portion, a further plurality of resilient connecting members extending outwardly from the aforementioned smaller felly and securing a larger of said fellies in concentric relationship therewith, and a plurality of resilient tines extending normally from each of said short sections of said fellies.

4. A cultivating tool which comprises a central portion, at least two fellies of different sizes, said fellies being substantially circular in shape and composed of resilient material, a plurality of resilient connecting members extending outwardly from said central portion and securing the smaller of said fellies in concentric relationship with said central portion, a further plurality of resilient connecting members extending outwardly from a smaller of said fellies and securing a larger of said fellies in concentric relationship therewith, a plurality of resilient tines extending normally from said fellies, each of said tines being integral with, and an extension of, one of said connecting members.

5. A rotatable cultivating tool which comprises a central portion, a felly, connecting members extending outwardly and during operation substantially horizontally from said central portion securing said felly in concentric relationship with said central portion, and a plurality of resilient tines extending normally from said members and said felly in a direction substantially parallel to the axis of rotation of the tool, said tines being turnably mounted relative to their mountings about an axis substantially perpendicular to the axis of rotation of the tool on said felly.

6. A rotatable cultivating tool which comprises a central portion, a felly composed of resilient material, a plurality of resilient connecting members extending outwardly and during operation substantially horizontally from said central portion securing said felly in concentric relationship with said central portion, and a plurality of resilient tines extending normally from said members and said felly in a direction substantially parallel to the axis of rotation of the tool, said tines being turnably mounted relative to their mountings about an axis substantially perpendicular to the axis of rotation of the tool on said felly.

7. A rotatable cultivating tool which comprises a central portion, a felly, a plurality of connecting members extending outwardly and during operation substantially horizontally from said central portion and through said felly connecting the latter in concentric relationship with said central portion, and a plurality of loosely fitting tines extending normally from said connecting members and said felly in a direction substantially parallel to the axis of rotation of the tool, each of said tines being integral with and an extension of said connecting members.

8. A rotatable cultivating tool which comprises a central portion, a felly, said felly composed of resilient material, a plurality of resilient connecting members extending outwardly and during operation substantially horizontally from said central portion and through said felly connecting the latter in concentric relationship with said central portion, and a plurality of loosely fitting tines extending normally from said connecting members and said felly, in a direction substantially parallel to the axis of rotation of the tool, each of said tines being integral with and an extension of one of said connecting members.

References Cited in the file of this patent

UNITED STATES PATENTS

| | | |
|---|---|---|
| 30,198 | Brainerd | Oct. 2, 1860 |
| 1,339,605 | Porteous | May 11, 1920 |
| 1,362,030 | Moffett | Dec. 14, 1920 |
| 2,020,620 | Smith | Nov. 12, 1935 |
| 2,699,023 | Caldwell | Jan. 11, 1955 |
| 2,766,675 | Suck | Oct. 16, 1956 |
| 2,938,324 | Rosenberg | May 31, 1960 |
| 2,951,547 | Lawrence | Sept. 6, 1960 |
| 2,972,852 | Van Der Lely et al. | Feb. 28, 1961 |
| 2,976,939 | Van Der Lely et al. | Mar. 28, 1961 |
| 3,010,526 | Van Der Lely et al. | Nov. 28, 1961 |
| 3,030,759 | Winter | Apr. 24, 1962 |

FOREIGN PATENTS

| | | |
|---|---|---|
| 207,729 | Australia | Apr. 16, 1957 |
| 1,024,547 | France | Jan. 10, 1953 |
| 1,185,988 | France | Oct. 11, 1959 |
| 1,193,525 | France | Nov. 3, 1959 |